United States Patent [19]

Rice

[11] Patent Number: 4,690,868
[45] Date of Patent: Sep. 1, 1987

[54] PROCESS FOR SURFACE TREATING CLAY MINERALS AND RESULTANT PRODUCTS

[75] Inventor: Camilla A. Rice, Sandersville, Ga.

[73] Assignee: E.C.C. America Inc., Atlanta, Ga.

[21] Appl. No.: 933,083

[22] Filed: Nov. 20, 1986

Related U.S. Application Data

[63] Continuation-in-part of Ser. No. 699,014, Feb. 8, 1985, abandoned.

[51] Int. Cl.$^4$ .................... B32B 5/16; C23C 16/00
[52] U.S. Cl. ............................ 428/409; 427/248.1; 427/255; 428/404
[58] Field of Search ............. 428/409, 408, 404, 402; 427/248.1, 255; 524/114, 262, 447; 523/216

[56] References Cited

U.S. PATENT DOCUMENTS

| | | | |
|---|---|---|---|
| 3,227,675 | 1/1966 | Papalos | 524/114 |
| 3,567,680 | 3/1971 | Iannicelli | 524/262 |
| 4,159,994 | 7/1979 | Seto et al. | 556/171 X |
| 4,336,304 | 6/1982 | Landingham et al. | 428/408 X |
| 4,522,958 | 6/1985 | Das et al. | 523/216 |
| 4,559,368 | 12/1985 | Heinen | 524/447 |

OTHER PUBLICATIONS

Savchits et al., "High Temperature Amination of the Surface of Oxide Catalysts", Mar. 7, 1979, pp. 1–7.
Satterfield, "Heterogeneous Catalysis in Practice", pp. 164–168, publ. McGraw-Hill Book Co.

*Primary Examiner*—Thomas J. Herbert
*Attorney, Agent, or Firm*—Stefan J. Klauber

[57] ABSTRACT

Directly aminating the surface of a 2-dimensional layered lattice silicate comprising reacting the lattice silicate in particulate form with gaseous $NH_3$ at temperatures below 100° C. to form bound $NH_2$ groups at the surface, the resulting modified 2-dimensional layered lattice silicate and a filled resin system employing the thusly modified silicate.

12 Claims, No Drawings

PROCESS FOR SURFACE TREATING CLAY MINERALS AND RESULTANT PRODUCTS

RELATED APPLICATION

This application is a continuation-in-part of co-pending application Ser. No. 699,014, filed Feb. 8, 1985 now abandoned.

BACKGROUND OF THE INVENTION

This invention relates generally to clay and clay minerals, i.e. to crystalline 2-dimensional layered lattice silicates having the general formula $E_iM_xSi_yO_n(OH)_m$, where M is Al, Mg, or Fe; x=2 to 6; y=2 to 8, n=2 to 20, m=0 to 8, and $E_i$ is one or more exchangeable ions (K, Na, Mg, Ca, Ba, Fe, Li, etc.). These layered silicates will hereinafter be referred to in this specification as "layered lattice silicates". More specifically, the invention relates to a method for aminating materials of this type, including e.g. kaolins and kaolinitic minerals, in order to produce products having new and unusual properties rendering same useful for a variety of purposes, including especially as fillers in plastic, rubber and other systems. The said products can also be more generally regarded as intermediates for subsequent functionalization thereof.

In the instance of clays such as kaolin clays, it has long been recognized that products having new properties and uses can be formulated by combining these aluminosilicates with organic materials. However, useful progress in this direction has tended to be limited by the lack of available covalent bonding at the mineral-/organic interface. In the past this difficulty has been partially overcome by surface modification of the kaolinite through coupling of organo-silane compounds and subsequent reaction between dependent silanes and organics.

Thus, in Papalos, U.S. Pat. No. 3,227,675, for example, kaolin clays are described, the surfaces of which are modified with organofunctional silanes. A typical such agent e.g. is a methacryloxypropyltrimethoxy silane. The kaolin clays so modified are advantageously used as fillers for natural and synthetic rubbers and the like. It is also pointed out in this patent that such modified products can serve as intermediates for synthesis of new pigments, which are useful as fillers for polymers, elastomers and resins. This result obtains because the silanes used to modify the kaolin clays are di- or polyfunctional, and only one functional group, the silane, is attached to the clay, leaving the remaining reactive groups to react further.

Additional references of this type include Iannicelli U.S. Pat. No. 3,290,165, and Iannicelli, U.S. Pat. No. 3,567,680.

However, the modification of aluminosilicates such as kaolin clays by the use of organosilanes, is a complicated and expensive process. Among other things, the cost of the organosilane itself is very high. Furthermore, the resulting products have only limited capability for further functionalization, regardless of the particular organosilanes utilized.

In a 1979 article by the Soviet authors Savchits, Romanovskii, and Egiazrov, entitled "High Temperature Amination of the Surface of Oxide Catalysts", it is reported that the surface hydroxyl groups of high surface area aluminosilicate catalysts can be replaced by surface-bound $NH_2$ groups via a high temperature gas stage reaction with ammonia. This reference is concerned with examining those conditions under which ammonia does not modify the surface of the catalysts, and has no applicability to low surface area, 2-dimensional layered crystalline, naturally occurring mineral materials, such as the clay materials which are of primary interest to the present invention.

In accordance with the foregoing, it may be regarded as an object of the present invention, to provide a relatively simple, inexpensive, and effective process, which enables surface modification of a clay mineral, such as a kaolin clay, by surface-bound $NH_2$ groups, thereby providing a new product having valuable applications, e.g. as a filler for paints, plastics, rubbers and paper.

It is a yet further object of the present invention, to provide a novel process for preparing analogs of known silanemodified silicates, such as analogs of known silane modified kaolin clays and the like.

It is a yet further object of the present invention, to provide a process and products, which enable the production of filled systems, for example, resin-filled systems, incorporating the products of the invention, which have superior properties with respect to mechanical aspects of same, as compared to prior art filled systems based upon prior art kaolin clay, and similar fillers.

SUMMARY OF INVENTION

Now in accordance with the present invention, the foregoing objects, and others as will become apparent in the course of the ensuing specification, are achieved in a method for directly aminating the surface of a layered lattice silicate, such as a clay mineral surface, comprising reacting the said clay mineral in substantially dry particulate form with a reactant system capable of forming bound $NH_2$ groups at said surface.

The said reaction is typically conducted at temperatures below about 1000° C., e.g. from about 150 to 1000° C. A preferred temperature range is from about 700° C. to 900° C. Lower temperatures, e.g. to as low as 150° C., may be utilized, but as the temperature approaches the low value indicated, the $NH_2$ surface concentration yielded may become too low for certain applications.

The composition to be treated may be reacted with ammonia gas. Although not required, this mixture may include as well an inert gas carrier, such as nitrogen or argon, and/or a reducing gas such as CO.

The reaction may be conducted in various apparatus capable of effecting good contact between the reactant gases and the particulate solids. The said reaction may e.g. be conducted in a rotary furnace, or in a fluidized bed reactor with the gaseous components passing upwardly through a suitable diffuser plate, and into a fluidized bed of the particulate material being treated. Typical reaction times are from about 2 to about 45 minutes, depending upon concentration of the reactants and temperatures. Longer reaction times can also be utilized. The quantity of ammonia utilized is preferably such as to provide at least about 0.6% of nitrogen on the clay by weight, following the amination process.

The resultant products find various applications and are particularly useful as fillers in resin or plastic systems, where same are found to considerably increase the useful mechanical properties of the said systems, such as toughness, adhesion properties, and the like, as will be further seen in the Examples to be set forth in this application.

Various clay and clay minerals may be treated by the method of invention, which is applicable generally to crystalline 2-dimensional layered lattice silicates. Thus, for example, clays of the halloysite, illite, kaolinite, montmorillonite, palygorskite groups, talc, mica, wollastonite, and various other clays can be readily treated by the present invention.

DESCRIPTION OF PREFERRED EMBODIMENTS

The invention will now be illustrated by a series of Examples, which, however, are to be considered as merely exemplary of practice of the invention, and not as delimitive thereof.

EXAMPLE I

Preparation of an Aminated Clay Product

In this Example, the starting material was a relatively coarse air-floated kaolin clay having approximately 60% by weight of the particles thereof of less than 2 microns equivalent spherical diameter (E.S.D.), and a BET surface area of 20 $m^2/g$. A 400 gram sample of this material was initially dried for 1½ hours in an oven at a temperature of 150° C. The sample showed a weight loss indicating that moisture had been successfully driven off from same to produce a substantially dry material.

The said sample was placed in a laboratory fluidized bed reactor. The system was equilibrated to 300° C. at which time ammonia gas at 300° C. was passed through the fluidized bed. The ammonia gas was flowed through the apparatus at the rate of about 1.17 standard cubic feet per minute (SCFM), and served to sustain the fluidized bed. The reaction was carried out for approximately 30 minutes. The resultant product was analyzed by elemental analysis for nitrogen content. The product displayed an increase in nitrogen of 0.06% nitrogen. This would correspond to the amount of nitrogen present after a 1% propyl amino silane treatment.

EXAMPLE II

In this Example, a further starting material of the type used in Example I, was subjected to treatment conditions identical to those described in Example I, except that the time of reaction was one hour, and the temperature of reaction was 230° C. The resultant product was again analyzed by elemental analysis for nitrogen content, and found to display an increase in nitrogen content of 0.04%.

EXAMPLE III

In this Example, the starting material was a further air-classified kaolin clay, having a particle size distribution such that 60% by weight thereof was of less than 2 microns E.S.D. The surface area in this instance was 14 $m^2/g$. The product was subjected to the same procedure as in the prior two Examples, except that the temperature of reaction was 185° C., and the time of reaction, 30 minutes. The resultant product was analyzed again by elemental analysis for nitrogen content, and found to display an increase in nitrogen of 0.05%.

EXAMPLE IV

In this Example, the same starting material was used as in Example III, and the reaction time was the same, i.e., 30 minutes. The temperature, however, was 150° C. The resultant product was again analyzed as aforementioned, and found to have an increase in nitrogen content of 0.05%.

EXAMPLE IV

In this Example, the starting material was an air-classified kaolin, having a particle size distribution such that 82% by weight thereof was of less than 2 microns E.S.D. The surface area was 20.5 $m^2/g$. The material was subjected to a procedure as in the prior Examples, except that heating and treatment were carried out in a rotary furnace. Because of the higher temperature used in the reaction, no preliminary drying step is needed as e.g. in Example I. Total time in the furnace was 45 minutes, $NH_2$ flow was 25 CFH (cubic feet per hour), with 15 minutes in the heating zone at 700° C. The resultant product was analyzed by elemental analysis for nitrogen content, and was found to display an increase of 0.5% nitrogen.

EXAMPLE VI

In this Example, the starting material was as in Example V and conditions of treatment were identical, except that the temperature in the heating zone was 800° C. Nitrogen increase in the product was determined to be 0.55%.

EXAMPLE VIII

In this Example, the starting material was as in Example V and conditions of treatment were identical, except that the temperature in the heating zone was 900° C. Nitrogen increase in the product was determined to be 0.5%.

Use of Aminated Products as Fillers

The products of the present invention are found to be particularly useful as fillers in polymers, elastomers, plastics paints or papers. Where such materials, for example, are used as fillers in epoxy compounds, it is found that the resultant cured epoxy systems display increased hardness and higher shear adhesion strength than have been obtainable with prior art fillers based upon kaolin clays, or silane-modified kaolin clays.

The following Example VIII is representative of the improvements achieved in filled resin systems in accordance with the present invention.

EXAMPLE VIII

In the present Example, an epoxy adhesion formulation was evaluated, which was based upon a conventional two-part epoxy composition, where in each instance the resin, i.e., the component "A" of the said system was the same, but the activator or curing component "B" comprised a polyamide formulated in one instance with a kaolin clay additive produced in accordance with the present invention, and in the comparative formulation, a kaolin clay additive which was formulated by conventional silane treatment. Thus, in particular, in each of the comparative formulations, the component "A" comprised 100 parts by weight of the total adhesive system, of the epoxy resin Araldite ® 6010, a product of Ciba Corporation.

Component "B" in the first instance comprised a clay additive produced in accordance with the procedure of Example V herein, in the amount of 50 parts by weight (approximately 17% or the total system), together with 150 parts by weight, of a polyamide, i.e. the Cropolamid ® B-352 product of Ciba.

For comparison, a further component "B" formulation was prepared wherein 150 parts by weight was the Cropolamid ® B-352 product, and 50 parts by weight was a clay additive, which was produced by conventional silane treatment. The silane treatment was such as to produce the same amount of nitrogen on the clay as the product of the present invention, used in the first "B" formulation, specifically being about 0.057% nitrogen by elemental analysis.

The components "A" and "B" in each instance were blended using a high-speed disperser. The adhesion to metals in the resultant products was measured as a shear adhesion test, using the procedure ASTM D 1002-72 (reapproved 1983), "Strength Properties of Adhesives in Shear by Tensile Loading" (using aluminum sheet—2.54 cm width). The Shore A-2 indentation hardness was also determined.

The Shore A-2 hardness in the case of the product of the invention was 98, and was measured at 30 in the case of the prior art product.

The shear adhesion using the aforementioned ASTM D 1002 specification was much higher in the case of the product of the present invention, i.e., 222.0, versus 38.4 in the case of the prior art formulation.

EXAMPLE IX

In this Example, the treated product of Example VI was used as a filler in an epoxy system. The epoxy resin used was the EPON resin of Shell Chemical Co. 30% of the treated clay product was used as a filler with 10% conventional amine curing agent and 60% of the EPON resin. For a control, similar formulations were prepared based upon 30% filler of an untreated kaolin identical to that used as the starting material in Example V. Molded test samples were prepared by casting followed by compression molding, and were evaluated for tensile strength and modulus by use of ASTM Procedure D638. Results were as follows:

| Filler (30%) | Tensile Strength (psi) | Modulus (psi) |
|---|---|---|
| Untreated kaolin | 287,000 | 68,300 |
| Treated kaolin | 544,000 | 97,100 |

In addition to the improvements shown, the samples prepared with the product of the invention were more rigid, cured better, and also showed a slight improvement in cure rate (as measured on a Haake Torque Rheometer), as compared to the samples prepared with the untreated kaolin filler.

The foregoing indicates the vast improvement in filled resin systems yielded in accordance with the product of the invention.

While the present invention has been particularly set forth in terms of specific embodiments thereof, it will be understood in view of the instant disclosure, that numerous variations upon the invention are now enabled to those skilled in the art, which variations yet reside within the scope of the present teaching. Accordingly, the invention is to be broadly construed, and limited only by the scope and spirit of the claims now appended hereto.

I claim:

1. A 2-dimensional layered lattice silicate having the general formula $E_iM_xSi_yO_n(OH)_m$, where M is Al, Mg, or Fe; x=2 to 6; y=2 to 8, n=2 to 20; m=0 to 8; and $E_i$ is one or more exchangeable ions; the surface of which has been modified by surface bound $NH_2$ groups.

2. A product in accordance with claim 1, wherein said material is a kaolin clay.

3. A filled resin system, comprising a resin matrix, and as a filler, a 2-dimensional layered lattice silicate having the general formula $E_iM_xSi_yO_n(OH)_m$, where M is Al, Mg, or Fe; x=2 to 6; y=2 to 8; n=2 to 20; m=0 to 8; and $E_i$ is one or more exchangeable ions, the surface of which has been modified by surface bound $NH_2$ groups.

4. A method for directly aminating the surface of a 2-dimensional layered lattice silicate having the general formula $E_iM_xSi_yO_n(OH)_m$, where M is Al, Mg, or Fe; x=2 to 6; y=2 to 8; n=2 to 20; m=0 to 8; and $E_i$ is one or more exchangeable ions, comprising:
reacting said layered lattice silicate in particulate form with a reactant system comprising gaseous $NH_3$ at temperatures below about 1000° C. to form bound $NH_2$ groups at said surface.

5. A method in accordance with claim 4, wherein said reaction is conducted at temperatures in the range of from about 150° C. to 1000° C.

6. A method in accordance with claim 4, wherein said reaction is conducted at temperatures in the range of from about 700° C. to 900° C.

7. A method in accordance with any of claims 4, 5 or 6, wherein said layered lattice silicate is a clay or clay mineral.

8. A method in accordance with any of claims 4, 5 or 6, wherein said silicate is a kaolin clay.

9. A method in accordance with any of claims 4, 5 or 6, wherein said reaction is conducted in apparatus for contacting particulate solids with gases.

10. A method in accordance with claim 5, wherein said reaction is conducted in a rotary furnace.

11. A method in accordance with claim 5, wherein said reaction is conducted in a fluidized bed reactor system.

12. A method for increasing the mechanical strength and adhesion properties of a filled resin system, comprising utilizing as said filler a kaolin clay, the surface of which has been modified by surface bound $NH_2$ groups.

* * * * *